United States Patent [19]
Rierson

[11] Patent Number: 5,100,314
[45] Date of Patent: Mar. 31, 1992

[54] APPARATUS AND PROCESS FOR DIRECT REDUCTION OF MATERIALS IN A KILN

[75] Inventor: David W. Rierson, Elm Grove, Wis.

[73] Assignee: Svedala Industries, Inc., Milwaukee, Wis.

[21] Appl. No.: 641,005

[22] Filed: Jan. 14, 1991

Related U.S. Application Data

[62] Division of Ser. No. 380,614, Jul. 14, 1989, Pat. No. 5,076,838.

[51] Int. Cl.$^5$ .............................................. F27B 7/14
[52] U.S. Cl. ................................. 432/103; 432/105; 432/106
[58] Field of Search ................. 432/103, 106, 105, 14

[56] References Cited

U.S. PATENT DOCUMENTS

| | | | |
|---|---|---|---|
| 3,865,541 | 2/1975 | Wilson et al. | 432/103 |
| 4,859,177 | 8/1989 | Kreisberg et al. | 432/106 |
| 4,890,563 | 1/1990 | White et al. | 432/106 |

FOREIGN PATENT DOCUMENTS

| | | |
|---|---|---|
| 1831867 | 7/1968 | Australia . |
| 6628865 | 5/1971 | Australia . |
| 5139679 | 5/1980 | Australia . |
| 934690 | 5/1948 | France . |
| 1476026 | 4/1967 | France . |
| 55-113820 | 9/1980 | Japan . |
| 55-91904 | 11/1980 | Japan . |
| 986451 | 3/1965 | United Kingdom . |

*Primary Examiner*—Henry C. Yuen
*Attorney, Agent, or Firm*—Nils H. Ljungman & Associates

[57] ABSTRACT

An apparatus for directly reducing pellets of material without melting the material includes the transporting of the pellets through drying and preheating zones on an oxidizing traveling grate and reduction in a ported rotary kiln. There is a kiln having a first end and a second end with the first end being substantially adjacent to the heating and oxidizing component for receipt of the pellets therefrom. The kiln is inclined downwardly and is rotated to advance the pellets through the kiln from the first end to the second end therefrom. The kiln includes an induration zone for indurating the pellets. The induration zone is adjacent to the first end and remote from the second end and extends for a substantial portion of the kiln from the first end. The kiln includes a reduction zone extending from the downstream end of the induration zone to the second end. A device is used to inject a reducing agent into the reduction zone of its kiln for making contact with the pellets advancing through the reduction zone. The kiln is heated to assist in a reduction of the pellets in the reduction zone. The pellets advancing through the induration zone are substantially free of contact with the reducing agent. The invention also includes the process for directly reducing the pellets of material.

10 Claims, 2 Drawing Sheets

APPARATUS AND PROCESS FOR DIRECT REDUCTION OF MATERIALS IN A KILN

This is a division of application Ser. No. 380,614, filed on July 14, 1989, now U.S. Pat. No. 5,076,838, issued Dec. 31, 1991.

BACKGROUND OF THE INVENTION

1. Field of the Invention

This invention relates to an apparatus and process for producing strong degradation-resistant agglomerates or pellets of mineral ore and, more specifically, to such an apparatus and process which includes passing the agglomerates or pellets through an oxidation zone on a traveling grate prior to being discharged into a kiln having a reducing atmosphere. Once in the kiln, the agglomerates or pellets are first advanced through an induration zone of the kiln in order to provide sufficient strength to the agglomerates or pellets passing therethrough to enable them to better withstand stress in a reduction zone of the kiln in order to improve the physical characteristics of the pellets and, therefore, the yield.

2. Description of the Prior Art

U.S. Pat. No. 3,753,682 is directed to a ported rotary kiln process for direct reduction of oxides and sulfides of metallic materials to increase the metallic content thereof. In particular, the apparatus and process disclosed therein is for pre-reduction of mineral ore including a controlled admission of hydrocarbon fuel and oxidizing gases into a rotary kiln for an oxygen reduction treatment which is not intended to produce liquid metal but is intended to increase the metallic content of a particle, pellet or agglomerate in a generally solid state by reducing the oxygen content thereof. The oxygen content is reduced in order to provide a pretreated charge material having increased utility in chemical processes requiring a mineral in metallic form or for increasing the capacity and fuel efficiency of subsequent smelting and refining processes.

Although the process is primarily used, as suggested above, for metallic materials, those skilled in the materials processing art will recognize that other material may include compounds of elements which are not metallic that can be reduced in a similar manner. Accordingly, references hereinbelow to the reduction of metallic material or to the increase of metal content are equally applicable to other material including compounds of elements which are not actually a metal in order to increase the content of at least one of the elements thereof.

In the preferred process taught in U.S. Pat. No. 3,753,682, finely divided iron ore and coal along with bentonite are mixed and rolled into suitable agglomerates or particles by a balling drum which may be of the type shown in U.S. Pat. Nos. 1,994,718 and 2,411,873. The resulting properly-sized green balls, agglomerates or pellets are deposited on the feed end of an oxidizing traveling grate in the oxidizing atmosphere of an oxidation zone. In the oxidation zone, fully oxidized, afterburner exhaust gas from the reduction process is utilized to dry and preheat the green balls or pellets on the grate in successive process regions. Upon leaving an initial drying region of the oxidation zone, the balls may be fully dry but may not be strong enough to survive the transfer into the kiln which has a reduction zone including a reducing atmosphere for reducing the balls or pellets. The traveling grate carries the dry balls or agglomerates or pellets into a preheat region of a higher temperature than the drying region. The pellets or agglomerates can be partially oxidized by their passage through the preheat region and, in turn, can be strengthened for the grate-to-kiln transition and early stages of reduction.

The preheated pellets or agglomerates from the oxidation zone are transferred via an enclosed chute from the grate to the reduction zone in a rotary kiln. The prior art rotary kiln is inclined downwardly at a slight angle below horizontal so that, upon rotation, the pellets in a bed at the upper, inlet end of the kiln will tumble and mix as they advance through the kiln. The kiln has axial burners and peripheral ports and may be of a type described in U.S. Pat. No. 3,182,980. With the kiln being disposed at a slight downward angle, the pellets or agglomerates can tumble through the kiln to a chute for discharge to a cooler. Gas flow through the kiln is in the opposite direction of the movement of the pellets or agglomerates therethrough. The gas flow preferably results from fuel and air alternatively being injected into the kiln respectively through the peripheral ports located around and along the length of the kiln. Fuel is only injected into the bed of pellets in the kiln while air is only injected above the bed of pellets. In U.S. Pat. No. 3,753,682, the preferred reducing agent is natural gas which is primarily introduced into the kiln through the peripheral ports located below the bed of the pellets or agglomerates. As the pellets or agglomerates move axially through the kiln, the fuel ports in the periphery of the kiln pass beneath the bed of pellets or agglomerates. Natural gas, substantially free of any oxidizing gases, is passed through the ports and into the bed to make initial and intimate contact with the pellets or agglomerates which are at a temperature of about 2000 degrees Fahrenheit. The contact of such gases with the pellets or agglomerates in an oxide form at such a high temperature causes a portion of the gas to quickly pyrolytically decompose with an amount thereof being reformed as a strong reducing agent including, for example, carbon monoxide and hydrogen. At the same time, air is introduced into the peripheral ports above the bed in order to support combustion of the non-oxidized products of reduction that issue from the charge. This combustion provides heat to sustain operating temperature in the kiln and, because of the remaining chemical energy in exhaust gases therefrom, furnishes the necessary fuel for the afterburner and subsequent heat for the oxidation on the traveling grate in the oxidation zone.

After reduction in the kiln, the pellets or agglomerates which contain significantly increased metallic fractions are directed to a cooler. After being cooled, the resulting material is screened, sized and separated for determining what portion of the material is properly processed and what portion must be discarded or recycled.

Another apparatus disclosed in U.S. Pat. No. 3,753,682 uses prehardened agglomerates or particles which are provided to a hopper and then fed through a hood into the upper end of a ported rotary kiln. The kiln is provided with an unported preheat section followed by the reduction zone thereof which is provided with the peripheral ports for the introduction of natural gas and air. The kiln may be of the type described in U.S. Pat. No. 3,182,980 and the contents thereof may be discharged to an indirect cooler which may be of the type shown in U.S. Pat. No. 2,792,298. The pellets or agglomerates may be previously heat hardened by such systems as are disclosed in U.S. Pat. Nos. 2,750,272; 2,750,273; 2,750,274 or 2,925,336.

It is also suggested in U.S. Pat. No. 3,753,682 that either of the embodiments disclosed therein may incorporate an addition of coal with the ore as the ore leaves the oxidation zone of the traveling grate before the pellets are reduced in the reduction zone of the kiln. Additional and more detailed features of the preferred ported rotary kiln system are disclosed in "The Direct Reduction of Iron Ores With The ACCAR SYSTEM" and "Five Hundred Tonne Per Day ACCAR Direct Reduction Plant at Orissa, India" which were published by the Allis-Chalmers Corporation. ACCAR and ACCAR SYSTEM were trademarks of the Allis-Chalmers Corporation and are presently the trademarks of Boliden Allis, Incorporated. The systems disclosed in these publications can employ gases, liquid or solid fuels singly or in combination to obtain the desired reduction of iron ores. In both systems, coal is preferably fed to the inlet of the rotary kiln with the ore charge. Additionally, these publications include an explanation of the use of a coal slinger at the outlet end of the rotary kiln for the introduction of a quantity of coal to the interior thereof. Still further, additional details are provided to explain the screening, magnetic separation of the unburned coal (char) and reduced pellets, and distribution of the material after it is discharged from the cooler.

"GRATE-CAR Direct Reduction System From Allis-Chalmers" and "GRATE-CAR System For Pyroprocessing Ferrous And Other Ores With Solid And/Or Fluid Fuels" were published by Allis-Chalmers Corporation to disclose an improved overall system for the direct reduction for material therein. GRATE-CAR was a trademark of Allis-Chalmers Corporation and is presently the trademark of Boliden Allis, Incorporated. As discussed in these publications, direct reduction feed stock traditionally included lump ore and/or iron oxide pellets which were fed at ambient temperature to a reduction vessel. This required that part of the vessel, whether a rotary or shaft kiln, be used as a preheater to elevate the feed stock to reaction temperature. As explained therein, conventional iron ore pelletizing and reduction processes employed two separate plants. In the pelletizing plant, the pelletized concentrate was heat treated and cooled. The pellets at ambient temperature were then fed to a reduction plant. With the development of the GRATE-CAR system, the pelletizing plant cooler was eliminated to result in a capital cost saving and a simplified process flow sheet. The charging of hot pellets to a rotary kiln also resulted in an energy savings. Still further, a smaller rotary kiln could be employed because additional kiln volume for pellet preheating would no longer appear to be required.

Generally, the GRATE-CAR system disclosed in the aforementioned publications consists of a traveling grate, a ported or nonported rotary kiln and a cooler connected in series. Pelletized concentrate is fed to the oxidizing traveling grate for drying and preheating in order to provide strength to the pellets. The hot preheated pellets are then fed directly into the rotary kiln. Solid fuel such as coal or other processing agents can be added to the grate discharge along with the pellets to the rotary kiln. In the case of a ported kiln, natural gas, oil or other fluid fuels can be introduced through the ports. Pellets discharging from the lower end of the kiln are cooled in a cooler.

One aspect of the GRATE-CAR system employs a kiln firing hood at the lower, discharge end of the rotary kiln which is designed to include a coal slinger. The coal slinger includes a pneumatic coal injection system which delivers coal to the downhill one-third or one-half of the kiln. The purpose of injecting the coal in this manner is to supplement the coal fed with the preheated pellets and to maximize the use of coal volatiles in the kiln. The reduced product and char discharge from the kiln into a rotary cooler where the material is cooled to about fifty degrees centigrade. The main control factors in the process are kiln temperature, exhaust gas composition and product quality. The optimum reducing condition for the kiln is maintained by adjusting the quantity of fuel and air inputs until a balance is achieved between the solids retention time in the kiln, temperature and product quality.

A specific installation which serves as an example of the GRATE-CAR system is described and disclosed in a publication entitled "Ilmenite Direct Reduction Project In Norway Using The GRATE-CAR Process" and published by Boliden Allis, Inc.

It should be recognized that some particular ores may be capable of being reduced by the prior art processes without producing any unacceptable fines which must be discarded or reprocessed. However, for many such ores, throughout the reduction processes described hereinabove, there is continuing concern regarding the strength and integrity of the pellets as they are passing through the oxidizing zone and into the reduction zone. Generally, throughout the reduction processes discussed hereinabove, there are various temperature, porosity and chemical changes to such green balls, pellets, or agglomerates which significantly affect their overall physical characteristics such as strength and subsequent ability to be properly reduced in order to produce a product of high metal content. Although the reduction in the systems described above is preferably provided in a ported or non-ported rotary kiln which is downwardly inclined to advance the pellets therethrough, the use of other kiln systems with other means for advancing the pellets would also depend on the integrity of the pellets for proper reduction. Accordingly, there remains a need for any apparatus or process which can be employed to further improve the overall physical characteristics, such as the overall strength, of the pellets to further insure their proper integrity as they are reduced in a kiln and subsequently discharged in a form having a higher metal content.

The above listed patents and publications are incorporated by reference as if the entire contents thereof were fully set forth herein.

OBJECTS OF THE INVENTION

It is an object of the present invention to provide a process and apparatus for the reduction of pellets including means for improving the physical characteristics of the pellets prior to subjecting the pellets to a reducing environment.

It is another object of the invention to provide such a process and apparatus which will increase the pellet yield of the material by minimizing the degradation of the pellets during the reduction.

It is still a further object of the invention to provide such a process and apparatus which will provide heat hardening of the pellets of material prior to their being reduced.

It is yet another object of the invention to provide a process and apparatus to reduce the fine contents resulting from the reduction process.

SUMMARY OF THE INVENTION

These and other objects of the invention are provided in a preferred process for directly reducing pellets without melting the material. The process includes the steps of drying and preheating the pellets with an oxidizing gas on a traveling grate; discharging the pellets from the oxidizing traveling grate to a substantially adjacent first end of a kiln; and advancing the pellets through the kiln from the first end to the second end thereof. The advancing of the pellets includes initial advancing of the pellets through an induration zone of the kiln having an environment and being at a temperature to indurate the pellets. The induration zone of the kiln is adjacent to the first end and remote from the second end and extends for a substantial portion of the kiln from the first end. The process also includes the steps of indurating the pellets in the induration zone during the initial advancing. There is further advancing of the pellets from the induration zone after the indurating through a reduction zone of the kiln extending substantially from a downstream end of the induration zone to the second end of the kiln. Additional steps include injecting a reducing agent into the reduction zone for contact with the pellets in the reduction zone and reducing the pellets during the further advancing through the reduction zone. The indurating of the pellets includes retaining the pellets in the induration zone during the initial advancing therethrough with the pellets being substantially free of contact with the reducing agent.

Other objects of the invention are provided by a preferred apparatus for directly reducing pellets of material without melting the material. The apparatus includes a heating and oxidizing component and an element for transporting the pellets through the heating and oxidizing component for heating and oxidizing the pellets. A kiln has a first end and a second end with the first end being substantially adjacent to the heating and oxidizing component. The pellets are discharged from the heating and oxidizing component to the first end of the kiln. There is an arrangement for advancing the pellets through the kiln from the first end to the second end thereof. An induration zone in the kiln is for indurating the pellets and the induration zone is adjacent to the first end and remote from the second end and extends for a substantial portion of the kiln from the first end. The kiln includes a reduction zone extending from the downstream end of the induration zone to the second end of the kiln. There is included devices for injecting a reducing agent into the reduction zone of the kiln for making contact with the pellets advancing through the reduction zone and for assisting in the reduction of the pellets in the reduction zone. The pellets are advanced through the induration zone during induration thereof with the pellets therein being substantially free of contact with the reducing agent.

DESCRIPTION OF THE PREFERRED EMBODIMENTS

Figure 1:
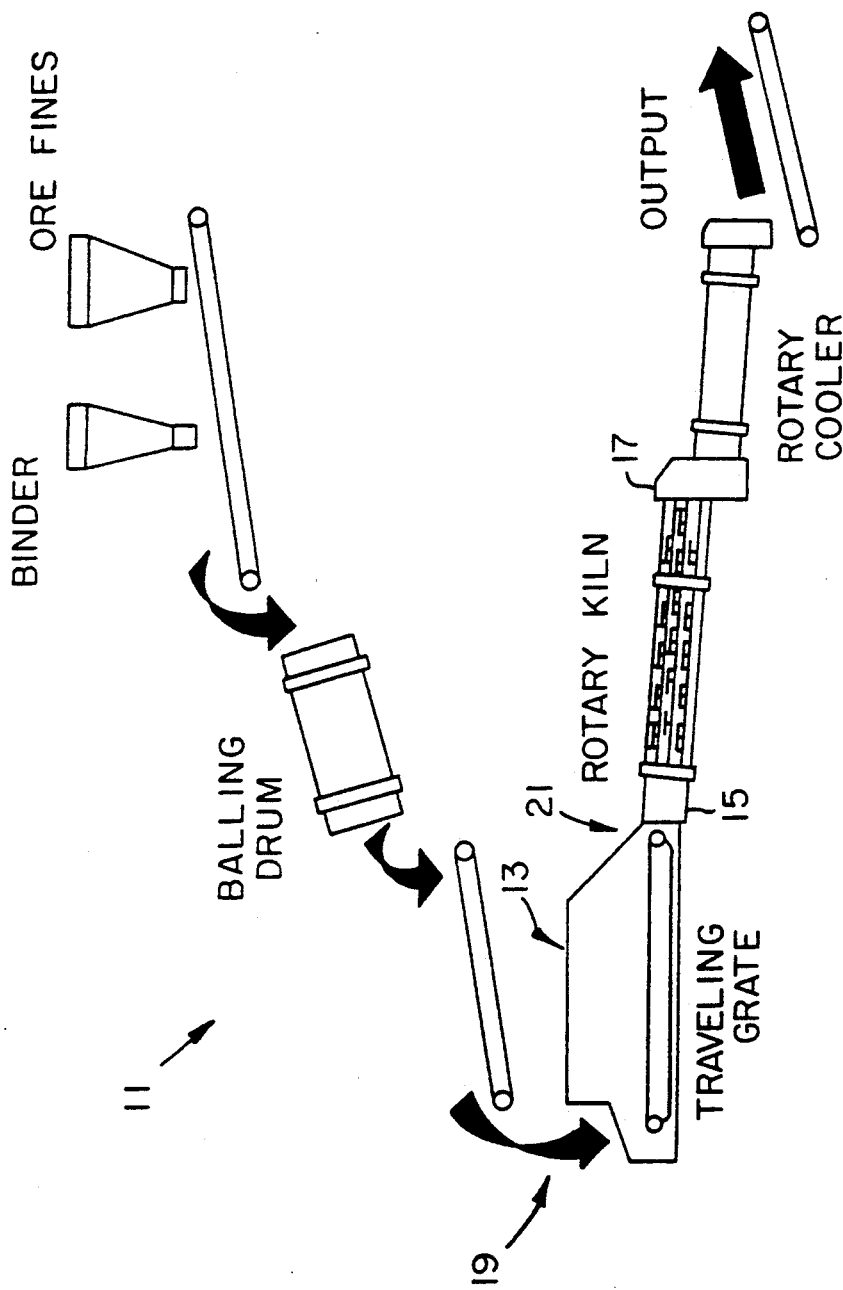
FIG. 1 is a schematic, simplified view of the prior art GRATE-CAR system for generally pelletizing, drying, preheating, reducing, and cooling pellets of metal bearing material.

As seen in FIG. 1, the GRATE-CAR system 11 of the prior art includes the combination of a binder to ore fines for forming green balls in a balling drum. The green balls of metal bearing material are deposited on a traveling grate for conveyance through a drying and preheating region of an oxidation zone 13. The preheated pellets of the material are then transported to the adjacent end 15 of a rotary kiln. In the rotary kiln, fuel and air are added to cause a reduction of the pellets as they slowly advance by rotation from the first end 15 to the second end 17 of the inclined rotary kiln. The hot pellets of reduced material are then transferred to a rotary cooler to reduce the temperature thereof. The output from the rotary cooler is then advanced for proper screening, separation and collection of the desired finished product and various by-products.

Although the schematic view of FIG. 1 generally represents the major components of the prior art GRATE-CAR system, additional features clearly shown in the patents and documents incorporated by reference and discussed above should be discussed prior to a description of the preferred invention. For example, after the pellets are basically formed in the balling drum and prior to advancement to the traveling grate, the green balls are properly sized at 19 in a roller classifier with oversized balls being fractured and returned into the feed bins. The traveling grate and the oxidation zone 13 are primarily divided into drying and preheating sections or regions. Although not always required, the drying section may include an updraft drying portion where the gases flow upwardly therethrough and a downdraft drying portion where the gases flow downwardly therethrough. The preheat portion of the oxidation zone 13 is intended, after drying, to further raise the temperature and improve the physical characteristics of the pellets of material therein for preventing shock and degradation upon entry into the rotary kiln.

Again, although not shown in detail in FIG. 1, the exhaust gases from the rotary kiln are generally removed at a chute area 21 between the traveling gate and the first end 15 of the kiln rather than being passed directly to the traveling grate. However, the exhaust gases are at least partially used, after being fully oxidized, for flow through the preheat region of the oxidation zone of the traveling grate and for the updraft drying and downdraft drying regions thereof. Additionally, between the traveling grate and the rotary kiln, as the pellets are being transferred in the chute area 21 from the traveling grate to the first end 15 of the rotary kiln, fuel, preferably in the form of coal, is added in order to be mixed with the pellets to provide the primary source of the reducing agent for reducing the pellets or particles of material in the rotary kiln. Additionally, fuel in the form of gas or liquid may be added to the rotary kiln through ports in the lower region thereof for flow through the bed of pellets or particles in the kiln. Air is supplied to the interior of the rotary kiln through the ports above the bed. The air is used to combust the exhaust reduction gases in the kiln to produce sufficient heat in the system for proper reduction in the kiln and for drying and preheating the pellets on the traveling grate in the oxidation zone. Still further, some installations include a coal slinger at the second, lower end 17 of the rotary kiln for the injection of coal. The coal slinger injects the coal about one-third to about one-half of the length of the kiln from the second end 17 thereof.

As generally described, the GRATE-CAR system of the prior art utilizes the traveling grate to dry and preheat balled concentrate prior to its transfer into the ported or non-ported rotary kiln. The hot pellets, which have improved physical strength because of the drying and preheating, are typically accompanied by an addition of solid fuel in the transfer chute 21 between the traveling grate and the first end 15 of the rotary kiln to allow the reduction reaction to proceed almost upon entry into the rotary kiln. The exhaust gases exhausting from the rotary kiln at the first end 15 thereof are combusted in an afterburner chamber (not shown) so that an oxidizing gas stream is available for process requirements associated with the drying and preheating sections of the oxidizing traveling grate 13.

Figure 2:
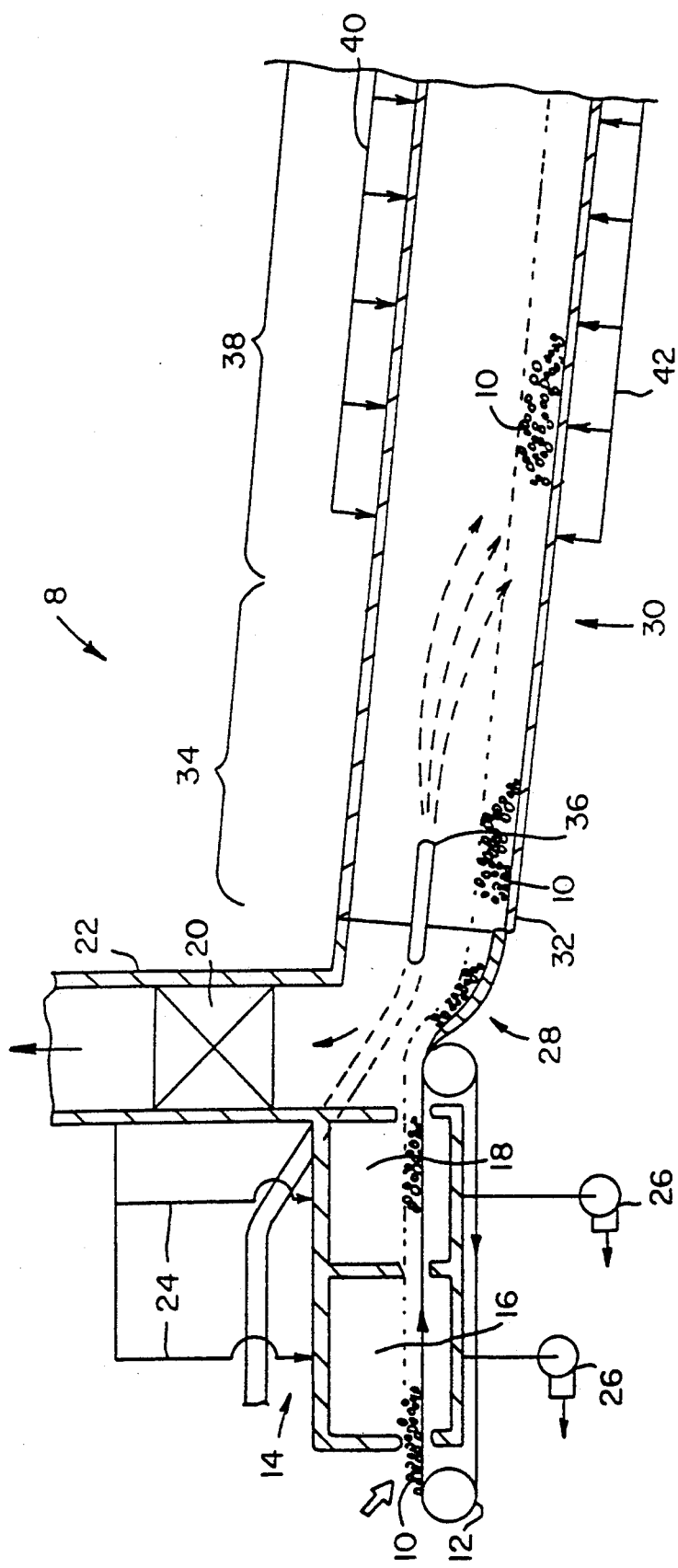
FIG. 2 is a schematic view of a portion of an apparatus for reducing metal bearing material without melting the material including a preferred induration zone and various features of the invention.

As seen in FIG. 2, the preferred system 8 includes additional means for further improvement of the physical characteristics, such as strength, of the pellets prior to subjecting the pellets to an intimate reducing environment and the ensuing pellet stresses attendant with that environment while further improving the potential for a significantly higher pellet yield. It should be recognized that some of the components shown in FIG. 2 are in simplified form and may be altered or modified to include specific features or equipment as suggested by the various patents and publications incorporated by reference hereinabove.

In the preferred embodiment, green balls or pellets 10 are deposited on an oxidizing traveling or moving grate 12 which advances through an oxidizing or oxidation zone 14. The green balls or pellets 10 are preferably formed by a balling drum and a roller classifier as discussed above. The pellets 10 advance on the grate 12 through a drying region 16 and a preheat region 18 of the oxidation zone 14. In order to properly dry and preheat the pellets 10, the preferred oxidation zone 14 basically uses exhaust gases from the reduction zone 38. Generally, the exhaust gases are fully oxidized by the use of an afterburner 20 in an exhaust gas stack 22. At least a portion of the fully oxidized exhaust gas is directed by flow lines 24 and associated fans 26 to cause the heated gas to flow through the preheat region 18 and the drying region 16.

It should be kept in mind that the embodiment shown in FIG. 2 is in simplified form and some installations may include the introduction of outside air into the system for proper control of the temperature and/or to provide an excess quantity of oxygen to insure full oxidation of the gases to be used on the grate in the oxidation zone 14. Still further, other modifications may include the exhaust gases (with the ambient air added thereto) initially passing through the preheat region 18 and then being further directed to an updraft drying region and/or a downdraft drying zone of the drying section 16. Generally, exhaust gases which have been used for preheating and drying as well as the remainder of the exhaust gases from the afterburner 20 are combined for further processing, heat removal and cleaning prior to discharge to the atmosphere.

After the pellets 10 have advanced through the drying region 16 and the preheat region 18 of the grate 12 in the oxidation zone 14, they proceed to a transition chute 28 between the grate 12 of the oxidation zone 14 and a preferred rotary kiln 30.

As discussed above, some of the systems described in the prior art patents and publications incorporated by reference employ a transition chute for the addition of a solid fuel such as coal directly to the preheated pellets for combined entry into the first end of the rotary kiln. The amount of solid fuel added by this means can vary but may include as much as fifty to one hundred percent of the total fuel employed in the reduction process. Consequently, the introduction of the solid fuel or coal in this manner in the prior art caused the reduction reaction to proceed almost upon entry into the first end of the rotary kiln.

However, the preferred invention includes an induration zone 34 in the rotary kiln 30 at a first end 32 thereof to provide further stabilization and strengthening of the pellets prior to them being brought into intimate contact with any reducing agent. As will be seen, the pellets are heat hardened in the induration zone 34. The heat which directly contributes to induration is also needed for the reduction in the reduction zone 38 when the pellets 10 are in intimate contact with a reducing agent. If the reducing agent were present in the induration zone 34, the material in the heated pellets would begin to reduce. Accordingly, rather than introducing coal or any other reducing agent at the transition chute 28, the preferred invention includes means for initially advancing the pellets 10 through the induration zone 34, including an initial portion of the kiln 30, in a stabilizing, heated environment substantially free of either oxidation or reduction by insuring that the pellets are substantially free of any contact with coal or any other reducing agent.

As a result, the reducing agent, which is in the form of coal in the preferred embodiment, is injected into the kiln by a coal slinger (not shown) or other type of coal-propelling system discussed hereinabove. A discharge end 36 of the coal slinger extends into the rotary kiln 30 for discharge into the interior of the rotary kiln at the first end 32 thereof. The coal leaving the discharge end 36 at the first end 32 is provided sufficient velocity to propel the coal inwardly of the rotary kiln beyond the induration zone 34 to the reduction zone 38 of the kiln 30. As a result, the pellets 10 will advance through the induration zone 34 with substantially no coal in the bed of pellets 10 for contact and possible reaction therebetween. Coal slingers of the type described are well known in the minerals processing art and may be of the same type discussed in the patents and publications incorporated by reference for the introduction of coal to the second or discharge end of a rotary kiln.

Allowing the pellets 10 to form the bed at the first end 32 of the rotary kiln 30 without the inclusion of any reducing agent therein provides further strength improvement of the pellets after they have discharged from the preheat region 18 of the traveling grate. Accordingly, the pellets 10 are heat hardened in the induration zone 34. Advancing the pellets for some time in the induration zone 34 without the presence of a reducing agent insures further induration or strengthening of the pellets 10 prior to their reduction in the reduction zone 38 of the rotary kiln 30. The rotating action of the rotary kiln will cause the pellets 10 at the upper end of the kiln to be continuously mixed as they slowly progress down the inclined interior surfaces thereof. The slow advancement of the pellets through the induration zone 34 provides the desired time after the preheating on the grate in the oxidation zone 14 for the pellets 10 to be further strengthened prior to their advancement into the reduction zone 38.

Heat is required for both the induration and the reduction of the pellets. In the preferred process, the rotary kiln 30 is a ported rotary kiln which allows the introduction of air into the upper or overbed region of the reduction zone 38 of the rotary kiln 30. The air is introduced through a series of nozzles 40 arranged around and along the rotary kiln. A control system (not shown) insures that the air is directed to the region above the bed rather than through the bed of pellets 10. The air is used to combust the reduction exhaust gases so that the resulting heat, in the form of hot reduction exhaust gas, will pass through the interior of the kiln and out the exhaust gas stack 22. The heated exhaust gas provides the heat required for proper induration and, as discussed above, also provides heat for the drying region 16 and preheat region 18 of the traveling grate in the oxidizing zone 14. As the hot exhaust gases pass over the bed of pellets 10 in the induration zone 34, there is no significant chemical reaction therebetween as the heat is simply absorbed by the pellets 10 for the desired induration period. Still further, the heated pellets 10 from the induration zone are at a sufficient temperature for proper reduction in the reduction zone 38 when the pellets 10 are brought into intimate contact with the reducing agent.

Accordingly, once the pellets 10 are by continuous advancement delivered to the reduction zone 38 of the rotary kiln 30, the addition of the coal, or other reducing agent, into the continuously mixing bed of heated pellets 10 provides proper contact therebetween for reduction of the pellets. Although the preferred system employs the reducing agent in the form of coal, it should be recognized that ported rotary kilns of the type described can also be used for the introduction of a reducing agent in the form of gas or oil or any combination thereof including the coal. For this purpose, the preferred ported rotary kiln 30 includes an array of nozzles 42 at the lower region of the rotary kiln 30 in the reduction zone 38 for the introduction of gas or oil. The gas or oil is supplied by a control system (not shown) to the array of nozzles 42 which are below the bed of pellets 10 to insure that the reducing agent will filter and pass through the pellets 10 for intimate contact therebetween in the reduction zone 38. Still further, as mentioned above, coal could be provided to the reduction zone through a coal slinger or the like (not shown) at the discharge end of the rotary kiln 30. Such a coal slinger would not be expected to project the coal beyond the center region of the kiln and therefore would not be expected to project the coal to the induration zone 34.

Reduction of the pellets in the reduction zone 38 in the manner described, after their having been strengthened and heat hardened in the induration zone 34, enables the pellets 10 to further withstand the tumbling and advancing action of the rotary kiln throughout the reduction process in the reduction zone 38. Consequently, more of the pellets are properly reduced for subsequent cooling and collection upon exit from the rotary kiln 30 and the reduction zone 38 thereof. As a result, the preferred invention increases the pellet yield so that more of the highly concentrated material is in a proper pellet form for effective use in subsequent processes.

In order to better understand the preferred embodiment of the invention as discussed above, it is appropriate to discuss some details of an existing process which is being used in Tyssedal, Norway and could be altered to include the improvements of the present invention if the pellets discharging from the grate were determined to have an inferior physical quality. Specifically, the detailed process employed in Tyssedal, Norway is disclosed in the publication entitled "Ilmenite Direct Reduction Project In Norway Using The GRATE-CAR Process" and discussed hereinabove.

Generally, in this process, pelletized ilmenite concentrate is fed to a traveling grate where the pellets are dried and preheated using fully oxidized kiln exhaust gas. The hot preheated pellets are fed directly to a ported kiln for eventual reduction of the iron oxide to metallic iron in the presence of lump coal. The reduced pellets and coal char are discharged from the kiln to an indirect rotary drum cooler. The purpose of the plant is to prepare pellet products having a high metallic content for use as feed stock to an electric arc smelting furnace. A primary product of this particular plant includes titanium slag containing 70%-75% titanium dioxide ($TiO_2$). The slag is shipped to users where it is further processed into a titanium dioxide pigment for use as a whitener in paint, paper and plastic products. The by-product of the smelting operation is a pig iron which is sold to steelmakers and foundries.

In order to determine the proper coal to be used in the process, coal ranging from lignites to high quality bituminous was tested. The results of the test demonstrated that all coals were acceptable with respect to the quality of product achieved. However, the test data confirmed that no usable recyclable char could be retrieved from the use of lignite because of the severe degradation. However, with one pass through the kiln, the bituminous coals did generate coarse char with the amount and quality of char fractions substantial enough to consider it for use by recycling.

Generally, the ilmenite ore is passed through a grinding mill and pumped to a slurry tank to form a 62% solid slurry. The slurry is pumped through filters to form filter cakes containing about 9.5% moisture. About seven and one-half kilograms of bentonite are mixed with each ton of filter cake and conveyed to a balling feed bin. The mixture is then fed to a long rubber lined balling drum for green ball formation. The drum discharge is deposited into a roller classifier which eventually results in properly sized 9 by 16 mm green balls which can be directed to the traveling grate.

The preferred grate is about 2.8 m wide and about 21 m long for carrying a bed of green balls 225 mm deep. The preferred process gas used in the various zones on the grate is generated in an afterburner chamber mounted vertically at the grate-kiln interface. The afterburner chamber receives kiln exhaust gas laden with unburned coal volatiles. This exhaust gas is at a temperature of about 800° C. to about 900° C. Air is radially blown into the afterburner to completely oxide the volatiles and to maintain this gas at a temperature of about 800° C. to about 1100° C. The resultant waste gas contains about 8% to about 10% oxygen as it leaves the afterburner chamber. Approximately 35% of the gas is used in the oxidizing zone on the grate with the balance being sent to the waste gas handling system. However, prior to the gas reaching the pellet bed, it is tempered with a bleed-in of ambient air to about 700° C. to about 800° C. In this particular example, the gas in this system is cooled by the pellets and then is split into two streams and induced through a downdraft and an updraft drying zone before being recombined with the balance of the afterburner exhaust gas.

In the Tyssedal, Norway process, the preferred rotary kiln has an overall diameter of about 5.8 m and may be from about 71.5 m to about 100 m long with tapered feed and discharge ends. The induration zone would include about 10% to about 35% of the overall length of the kiln which might vary from as little as 50 m to as much as about 110 m depending on the type of material being processed. The reduction zone would include about 65% to about 90% of the overall length of the kiln.

The preferred kiln is lined with about 228 mm thick castable refractory. The kiln is erected at a slope of about 2 percent as it slightly extends downwardly from the first or feed end and is supported by a plurality of carrying rollers.

The kiln can include a plurality of ports which are spaced in an orderly pattern along the length of the reduction zone of the kiln and around the girth of the kiln. Preferably, the ports are arranged in a plurality of rows with each port extending through the kiln shell and ending at the inside refractory surface. The purpose of the ports is to deliver radially directed process air along the length of the reduction zone of the kiln. This air combusts the gas which evolves from the coal in the bed of the kiln. The amount and placement of the air through the ports determines the shape of the temperature profile in the kiln. The total air flow is simultaneously injected through selected numbers of rows of ports which are positioned above the bed depending upon the demand of the current operation. Typically, the rotary kiln will rotate at a speed between 0.25 rpm and 0.75 rpm with the pellets typically requiring 7 to 8 hours to advance therethrough. The total time the pellets remain in the kiln can depend on the material being reduced therein and could range from as low as two hours to as high as ten hours. As a result, it would be expected for the pellets to preferably remain in the induration zone for a period of time ranging from about one hour to two hours. However, depending on the ore being processed, it would not be unusual for the pellets to remain in the induration zone for a period of time ranging from about one-fourth of an hour to about three-and-one-half hours. For example, some material may be preferably indurated for one-half to one hour while others for one and one-half to two-and-one-half hours or for two to three hours.

Downstream of the preferred kiln is a 4.1 m diameter by 66 m long rotary cooler. Cooling of the product is done indirectly by water flow on the outside of the cooler shell. As a result, the product is cooled from about 1000° C. to about 50° C.

While the process described hereinabove for Tyssedal, Norway provides a specific example of the application of the present invention for the formation of pellets having a high concentration of iron, it should be recognized to those skilled in the minerals processing art that any number of other materials might be used in the preferred process of the present invention. For example, it should be clear that the preferred process and apparatus could be employed for improving the metallic content of lumps, particles, briquettes, or agglomerates of material selected from a group consisting of the oxides and sulfides of iron, nickel, zinc, copper, manganese, and chrome. It would, for example, be possible to include briquettes which are as large as 2 inches by 2 inches by 2 inches for proper oxidation, induration and reduction in the above-described process. It may also, for example, be possible for the preferred process to be employed for material including oxides and/or sulfides of titanium and/or phosphorus.

Depending on the type of material being oxidized and reduced, the temperature of the traveling grate may range from about 600° C. to about 1000° C. The temperature produced in the reduction zone would typically be 1000° C. to 1100° C. but, again, depending on the particular metal being processed may be as low as 700° C. or as high as 1200° C. to 1500° C. For example, some material may be properly reduced at temperatures between 800° C. and 900° C., 900° C. and 1000° C., or 1100° C. and 1200° C. in order to drive the reduction reaction to a desired completion.

The addition of the air to the reduction zone produces oxidation of the reduction gases for heating of the reduction zone and the induration zone. The amount of air remaining in the exhaust reduction gases after such oxidation would typically be less than 1% as it passes through the induration zone. The exhaust gases in the reduction zone do not generally react chemically with the pellets in the induration zone but simply transfer heat to the pellets in the bed as it passes through the upper region thereof prior to entrance into the afterburner.

Although the example and the preferred embodiment mentioned hereinabove employ a coal delivery slinger system for the introduction of solid fuel in the form of coal through the induration zone for mixing with the pellets in the reduction zone, it should be recognized that typical reduction processes of the type described can be performed by the use of a reducing agent in the form of oil, gas or a solid reducing material or any combination thereof. Clearly, the introduction of any of these types of reducing agents should be limited to the reduction zone so that the pellets passing through the induration zone are substantially free of any contact of the reducing agent in the induration zone.

The preferred process discussed hereinabove is intended to produce chemically proper agglomerates or pellets with a desired metal content but are, as mentioned above, also intended to produce such agglomerates or pellets which have sufficient physical or structural integrity for further processing after the oxidation-reduction process discussed above. Accordingly, the primary intent of such an oxidation-reduction process is to maximize the pellet yield by insuring that there is a minimum amount of fines produced during the process. In some such systems, it would not be uncommon for the fines to include 3% to 10% of the product yield. On the other hand, depending on the material being processed, yields which may include 20% fines would be undesirable and the use of the preferred process as discussed hereinabove could reduce such undesired fines to about 5% of the total yield of the oxidation-reduction process.

The invention as described hereinabove in the context of a preferred embodiment is not to be taken as limited to all of the provided details thereof, since modifications and variations thereof may be made without departing from the spirit and scope of the invention.

What is claimed is:

1. Apparatus for directly reducing pellets of a material at least partially containing compounds of elements to increase the content of at least one of the elements thereof without melting the material, said apparatus comprising:

heating and oxidizing means:
means for transporting said pellets through said heating and oxidizing means for heating and oxidizing said pellets;
kiln means having a first end and a second end;
said first end of said kiln means being substantially adjacent to said heating and oxidizing means:
means for discharging said pellets from said heating and oxidizing means to said first end of said kiln means:
means for advancing said pellets through said kiln means from said first end to said second end thereof;
said kiln means including means for indurating said pellets in an induration zone of said kiln means adjacent to said first end and remote from said second end and extending for a substantial portion of said kiln means from said first end;
said kiln means including a reduction zone extending from the downstream end of said induration zone to said second end;
means for injecting a reducing agent into said reduction zone of said kiln means for making contact with said pellets advancing through said reduction zone;
means for assisting in a reduction of said pellets in said reduction zone; and
said means for indurating including means for maintaining said pellets advancing through said induration zone substantially free of contact with said reducing agent.

2. The apparatus according to claim 1, further including means for producing hot reduction gases during said reduction of said pellets in said reduction zone and said means for indurating said pellets in said induration zone includes heating said pellets in said induration zone with said hot reduction gases from said reduction zone.

3. The apparatus according to claim 1, wherein said induration zone includes said substantial portion of said kiln means which is about 10% to about 35% of an overall length of said kiln means.

4. The apparatus according to claim 1, wherein said means for advancing of said pellets through said induration zone takes at least about one-fourth of an hour to about three-and-one-half hours for said advancing of said pellets through said induration zone.

5. The apparatus according to claim 1, wherein said means for assisting in said reduction of said pellets includes means for heating said pellets and causing contact with said reducing agent in said reduction zone with said pellets after said heating by said means for heating.

6. The apparatus according to claim 5, wherein said means for heating of said pellets includes said means for indurating said pellets in said induration zone.

7. The apparatus according to claim 5, wherein said means for reduction causes said reduction of said pellets with a resulting production of reduction exhaust gases and said means for heating includes means for introducing oxidizing gas to said reduction zone for combustion of said reduction exhaust gases.

8. The apparatus according to claim 7, wherein said means for indurating includes passing said reduction exhaust gases through said induration zone.

9. The apparatus according to claim 1, wherein said kiln means is a rotary kiln which is inclined downwardly from said first end thereof, said means for discharging said pellets causes a bed of said pellets to form in a lower region of said rotary kiln, and said means for advancing includes means for rotating said rotary kiln for causing said pellets in said bed to tumble and mix during movement from said first end to said second end of said rotary kiln.

10. The apparatus according to claim 9, wherein said reducing agent includes at least a quantity of solid reducing material, said means for injecting said at least a quantity of said solid reducing material extends into the interior of said rotary kiln at said first end of said rotary kiln, and said means for injecting said at least a quantity of said solid reducing material propels said at least a quantity of said solid reducing material through said induration zone for deposit in said reduction zone for mixing with said pellets in said reduction zone during said rotating of said rotary kiln.

* * * * *